US009069355B2

(12) United States Patent
Tait et al.

(10) Patent No.: US 9,069,355 B2
(45) Date of Patent: Jun. 30, 2015

(54) SYSTEM AND METHOD FOR A WIRELESS FEATURE PACK

(71) Applicant: Hexagon Technology Center GmbH, Heerbrugg (CH)

(72) Inventors: Hogar Tait, San Marcos, CA (US); Paul Ferrari, Carlsbad, CA (US); Brian Frohlich, Carlsbad, CA (US); Jerry Gerent, Vista, CA (US); Bill Janewicz, Corona, CA (US)

(73) Assignee: Hexagon Technology Center GMBH, Heerbrugg (CH)

( * ) Notice: Subject to any disclaimer, the term of this patent is extended or adjusted under 35 U.S.C. 154(b) by 207 days.

(21) Appl. No.: 13/783,053

(22) Filed: Mar. 1, 2013

(65) Prior Publication Data

US 2013/0331986 A1    Dec. 12, 2013

Related U.S. Application Data

(60) Provisional application No. 61/657,674, filed on Jun. 8, 2012.

(51) Int. Cl.
  *G06F 19/00* (2011.01)
  *G05D 1/02* (2006.01)
  *G01B 5/008* (2006.01)

(52) U.S. Cl.
  CPC .............. *G05D 1/0268* (2013.01); *G01B 5/008* (2013.01); *G01B 2210/58* (2013.01)

(58) Field of Classification Search
  CPC ... H04W 28/08; H04W 88/06; H04W 76/021; H04W 80/04; H04L 69/324

USPC ................. 700/245, 248, 249, 253, 257, 258; 370/325, 328, 352, 392, 409
See application file for complete search history.

(56) References Cited

U.S. PATENT DOCUMENTS

| 4,492,036 A | 1/1985 | Beckwith |
| 4,561,776 A | 12/1985 | Pryor |

(Continued)

FOREIGN PATENT DOCUMENTS

| DE | 4345091 | 7/1995 |
| DE | 10112977 | 11/2002 |

(Continued)

OTHER PUBLICATIONS

International Search Report and Written Opinion, PCT/IB2013/001740, mailed on Sep. 27, 2013.

(Continued)

*Primary Examiner* — McDieunel Marc
(74) *Attorney, Agent, or Firm* — Knobbe, Martens, Olson & Bear, LLP

(57) ABSTRACT

Systems and methods for transmitting measurement data wirelessly are described herein. A coordinate measurement device comprises an articulated arm comprising a plurality of articulated arm members, a coordinate acquisition member at a distal end, and a base at a proximal end. The device further comprises an add-on device assembly coupled to the coordinate acquisition member. The device further comprises a feature pack coupled to the base of the articulated arm. The feature pack may receive the coordinate data and the add-on device data packet, inserts bits of the coordinate data into a packet that can be transmitted over a network, and wirelessly transmits the packetized coordinate data and the add-on device data packet to a base station.

13 Claims, 12 Drawing Sheets

(56) References Cited

U.S. PATENT DOCUMENTS

| | | |
|---|---|---|
| 4,961,267 A | 10/1990 | Herzog |
| 4,972,090 A | 11/1990 | Eaton |
| 5,084,981 A | 2/1992 | McMurtry et al. |
| 5,088,337 A | 2/1992 | Bennett |
| 5,148,377 A | 9/1992 | McDonald |
| 5,187,874 A | 2/1993 | Takahashi et al. |
| 5,189,797 A | 3/1993 | Granger |
| 5,251,156 A | 10/1993 | Heier et al. |
| 5,396,712 A | 3/1995 | Herzog |
| 5,408,754 A | 4/1995 | Raab |
| 5,412,880 A | 5/1995 | Raab |
| 5,505,003 A | 4/1996 | Evans et al. |
| 5,510,977 A | 4/1996 | Raab |
| 5,521,847 A | 5/1996 | Ostrowski et al. |
| 5,526,576 A | 6/1996 | Fuchs et al. |
| 5,528,505 A | 6/1996 | Granger et al. |
| 5,611,147 A | 3/1997 | Raab |
| 5,615,489 A | 4/1997 | Breyer et al. |
| 5,757,499 A | 5/1998 | Eaton |
| 5,768,792 A | 6/1998 | Raab |
| 5,794,356 A | 8/1998 | Raab |
| 5,822,450 A | 10/1998 | Arakawa et al. |
| 5,829,148 A | 11/1998 | Eaton |
| 5,917,181 A | 6/1999 | Yoshizumi et al. |
| 5,978,748 A | 11/1999 | Raab |
| 5,991,704 A | 11/1999 | Rekar et al. |
| 6,134,506 A | 10/2000 | Rosenberg et al. |
| 6,151,789 A | 11/2000 | Raab |
| 6,161,079 A | 12/2000 | Zink et al. |
| 6,166,811 A | 12/2000 | Long et al. |
| 6,219,928 B1 | 4/2001 | Raab et al. |
| 6,366,831 B1 | 4/2002 | Raab |
| 6,370,787 B1 | 4/2002 | Kikuchi |
| 6,430,828 B1 | 8/2002 | Ulbrich |
| 6,487,896 B1 | 12/2002 | Dall'Aglio |
| 6,526,670 B1 | 3/2003 | Carli |
| 6,598,306 B2 | 7/2003 | Eaton |
| 6,611,346 B2 | 8/2003 | Granger |
| 6,611,617 B1 | 8/2003 | Crampton |
| 6,618,496 B1 | 9/2003 | Tassakos et al. |
| 6,668,466 B1 | 12/2003 | Bieg et al. |
| 6,759,648 B2 | 7/2004 | Baxter et al. |
| 6,817,108 B2 | 11/2004 | Eaton |
| 6,892,465 B2 | 5/2005 | Raab et al. |
| 6,904,691 B2 | 6/2005 | Raab et al. |
| 6,925,722 B2 | 8/2005 | Raab et al. |
| 6,931,745 B2 | 8/2005 | Granger |
| 6,952,882 B2 | 10/2005 | Raab et al. |
| 6,973,734 B2 | 12/2005 | Raab et al. |
| 6,984,236 B2 | 1/2006 | Raab |
| 6,988,322 B2 | 1/2006 | Raab et al. |
| 7,003,892 B2 | 2/2006 | Eaton et al. |
| 7,017,275 B2 | 3/2006 | Raab et al. |
| 7,043,847 B2 | 5/2006 | Raab et al. |
| 7,051,447 B2 | 5/2006 | Kikuchi et al. |
| 7,051,450 B2 | 5/2006 | Raab et al. |
| 7,069,664 B2 | 7/2006 | Raab et al. |
| 7,073,271 B2 | 7/2006 | Raab et al. |
| 7,096,077 B2 | 8/2006 | Price et al. |
| 7,152,456 B2 | 12/2006 | Eaton |
| 7,174,651 B2 | 2/2007 | Raab et al. |
| 7,246,030 B2 | 7/2007 | Raab et al. |
| 7,269,910 B2 | 9/2007 | Raab et al. |
| 7,296,364 B2 | 11/2007 | Seitz et al. |
| 7,296,979 B2 | 11/2007 | Raab et al. |
| 7,313,264 B2 | 12/2007 | Crampton |
| 7,372,581 B2 | 5/2008 | Raab et al. |
| 7,395,606 B2 | 7/2008 | Crampton |
| 7,441,341 B2 | 10/2008 | Eaton |
| 7,525,276 B2 | 4/2009 | Eaton |
| 7,546,689 B2 | 6/2009 | Ferrari et al. |
| 7,568,293 B2 | 8/2009 | Ferrari |
| 7,578,069 B2 | 8/2009 | Eaton |
| D599,226 S | 9/2009 | Gerent et al. |
| 7,591,078 B2 | 9/2009 | Crampton |
| 7,614,157 B2 | 11/2009 | Granger |
| 7,624,510 B2 | 12/2009 | Ferrari |
| 7,640,674 B2 | 1/2010 | Ferrari et al. |
| 7,676,942 B2 | 3/2010 | Jordil et al. |
| 7,676,945 B2 | 3/2010 | Prestidge et al. |
| 7,693,325 B2 | 4/2010 | Pulla et al. |
| 7,743,524 B2 | 6/2010 | Eaton et al. |
| 7,774,949 B2 | 8/2010 | Ferrari |
| 7,779,548 B2 | 8/2010 | Ferrari |
| 7,784,194 B2 | 8/2010 | Raab et al. |
| 7,797,849 B2 | 9/2010 | Gomez |
| 7,805,851 B2 | 10/2010 | Pettersson |
| 7,805,854 B2 | 10/2010 | Eaton |
| 7,908,757 B2 * | 3/2011 | Ferrari ............ 33/503 |
| 7,984,558 B2 | 7/2011 | Ferrari |
| D643,319 S | 8/2011 | Ferrari et al. |
| 8,001,697 B2 | 8/2011 | Danielson et al. |
| 8,015,721 B2 | 9/2011 | Eaton et al. |
| 8,082,673 B2 | 12/2011 | Desforges |
| 8,099,877 B2 | 1/2012 | Champ |
| 8,104,189 B2 | 1/2012 | Tait |
| 8,112,896 B2 | 2/2012 | Ferrari et al. |
| 8,122,610 B2 | 2/2012 | Tait et al. |
| 8,123,350 B2 | 2/2012 | Cannell et al. |
| 8,127,458 B1 * | 3/2012 | Ferrari ............ 33/503 |
| 8,145,446 B2 | 3/2012 | Atwell et al. |
| 8,151,477 B2 | 4/2012 | Tait |
| 8,176,646 B2 * | 5/2012 | Ferrari ............ 33/503 |
| 8,201,341 B2 | 6/2012 | Ferrari |
| 8,220,173 B2 | 7/2012 | Tait |
| 8,229,208 B2 | 7/2012 | Pulla et al. |
| 8,327,555 B2 | 12/2012 | Champ |
| 8,336,220 B2 | 12/2012 | Eaton et al. |
| 8,402,669 B2 | 3/2013 | Ferrari et al. |
| 8,429,828 B2 * | 4/2013 | Ferrari ............ 33/503 |
| 8,438,747 B2 * | 5/2013 | Ferrari ............ 33/503 |
| 8,497,901 B2 | 7/2013 | Pettersson |
| 8,955,229 B2 * | 2/2015 | Ferrari ............ 33/503 |
| 2008/0016711 A1 | 1/2008 | Baebler |
| 2011/0112786 A1 | 5/2011 | Desforges |
| 2011/0170534 A1 | 7/2011 | York |
| 2011/0173827 A1 | 7/2011 | Bailey et al. |
| 2011/0175745 A1 | 7/2011 | Atwell et al. |
| 2011/0178765 A1 | 7/2011 | Atwell et al. |
| 2011/0213247 A1 | 9/2011 | Shammas |

FOREIGN PATENT DOCUMENTS

| | | |
|---|---|---|
| EP | 0522610 | 1/1993 |
| FR | 2740546 | 4/1997 |
| GB | 2274526 | 7/1994 |
| GB | 2 311 862 | 10/1997 |
| JP | 05/031685 | 2/1993 |
| JP | 2003/021133 | 1/2003 |
| JP | 2003/175484 | 6/2003 |
| WO | WO 98/08050 | 2/1998 |
| WO | WO 2008/080142 | 7/2008 |

OTHER PUBLICATIONS

European Patent Office, International Search Report and Written Opinion, Sep. 15, 2011, Issue PCT/US2010/055713.

* cited by examiner

SYSTEM AND METHOD FOR A WIRELESS FEATURE PACK

CROSS-REFERENCE TO RELATED APPLICATIONS

This application claims the priority benefit under 35 U.S.C. §119(e) to U.S. Provisional Patent Application Ser. No. 61/657,674 (filed 8 Jun. 2012), the entirety of which is hereby expressly incorporated by reference herein.

BACKGROUND

1. Field

The present disclosure relates to articulated arms and coordinate measurement, and more particularly to wireless coordinate measurement machines.

2. Description of the Related Art

Rectilinear measuring systems, also referred to as coordinate measuring machines (CMMs) and articulated arm measuring machines, are used to generate highly accurate geometry information. In general, these instruments capture the structural characteristics of an object for use in quality control, electronic rendering and/or duplication. One example of a conventional apparatus used for coordinate data acquisition is a portable coordinate measuring machine (PCMM), which is a portable device capable of taking highly accurate measurements within a measuring sphere of the device. Such devices often include a probe mounted on an end of an arm that includes a plurality of transfer members connected together by joints. The end of the arm opposite the probe is typically coupled to a moveable base. Typically, the joints are broken down into singular rotational degrees of freedom, each of which is measured using a dedicated rotational transducer. During a measurement, the probe of the arm is moved manually by an operator to various points in the measurement sphere. At each point, the position of each of the joints must be determined at a given instant in time. Accordingly, each transducer outputs an electrical signal that varies according to the movement of the joint in that degree of freedom. Typically, the probe also generates a signal. These position signals and the probe signal are transferred through the arm to a recorder/analyzer. The position signals are then used to determine the position of the probe within the measurement sphere. See e.g., U.S. Pat. Nos. 5,829,148 and 7,174,651, which are incorporated herein by reference in their entireties.

Generally, there is a demand for such machines with a high degree of accuracy, high reliability and durability, substantial ease of use, and low cost, among other qualities. The disclosure herein provides improvements of at least some of these qualities.

SUMMARY

One aspect of the disclosure provides a coordinate measurement device. The device comprises an articulated arm comprising a plurality of articulated arm members, a coordinate acquisition member at a distal end, and a base at a proximal end. The coordinate acquisition member may generate coordinate data based on a measured position of the articulated arm. The device further comprises an add-on device assembly coupled to the coordinate acquisition member. The add-on device assembly may generate an add-on device data packet that can be transmitted over a network in response to a trigger signal received by the add-on device assembly that indicates a time at which the coordinate acquisition member measured a position of the articulated arm. The add-on device data packet may comprise measurement data of the add-on device assembly. The device further comprises a feature pack coupled to the base of the articulated arm. The feature pack may receive the coordinate data and the add-on device data packet, inserts bits of the coordinate data into a packet that can be transmitted over a network, and wirelessly transmits the packetized coordinate data and the add-on device data packet to a base station.

Another aspect of the disclosure provides a method of operating a coordinate measurement device. The method comprises continuously receiving coordinate data based on measured positions of an articulated arm. The method further comprises continuously receiving add-on device data packets that can be transmitted over a network from an add-on device assembly coupled to the articulated arm. The add-on device data packets may be generated in response to trigger signals received by the add-on device assembly that indicate times at which positions of the articulated arm are measured. The add-on device data packets may comprise measurement data of the add-on device assembly. The method further comprises inserting bits of each received coordinate data into packets that can be transmitted over a network. The method further comprises transmitting wirelessly the packetized coordinate data and the add-on device data packets to a base station.

Another aspect of the disclosure provides a base station. The base station comprises a first processor configured to receive wirelessly over a network packetized coordinate data and an add-on device data packet. The packetized coordinate data may comprise coordinate data based on a measured position of an articulated arm. The add-on device data packet may be generated in response to a trigger signal received by an add-on device assembly coupled to the articulated arm that indicates a time at which a position of the articulated arm is measured. The add-on device data packet may comprise measurement data of the add-on device assembly. The base station further comprises a second processor configured to extract coordinate data from the packetized coordinate data and to extract add-on device measurement data from the add-on device data packet. The base station further comprises a third processor configured to associate the extracted coordinate data with the extracted add-on device measurement data for further processing. The association may be based on a timestamp of the packetized coordinate data and a timestamp of the add-on device data packet.

Another aspect of the disclosure provides a method of operating a base station. The method comprises receiving wirelessly over a network packetized coordinate data and an add-on device data packet. The packetized coordinate data may comprise coordinate data based on a measured position of an articulated arm. The add-on device data packet may be generated in response to a trigger signal received by an add-on device assembly coupled to the articulated arm that indicates a time at which a position of the articulated arm is measured. The add-on device data packet may comprise measurement data of the add-on device assembly. The method further comprises extracting coordinate data from the packetized coordinate data and extracting add-on device measurement data from the add-on device data packet. The method further comprises associating the extracted coordinate data with the extracted add-on device measurement data for further processing. The association may be based on a timestamp of the packetized coordinate data and a timestamp of the add-on device data packet.

BRIEF DESCRIPTION OF THE DRAWINGS

Further objects, features and advantages of the invention will become apparent from the following detailed description taken in conjunction with the accompanying figures showing illustrative embodiments of the invention, in which.

DETAILED DESCRIPTION

Hereunder, various embodiments will be described with reference to the accompanying drawings. In some coordinate measuring machines (CMMs), the structural characteristics of an object may be captured and sent to a computer for processing, but the location of such CMMs may be limited by a physical connection with the computer. While some CMMs may be reengineered to include wireless capabilities, this would require users of existing CMMs to purchase new machines. Furthermore, data captured by some CMMs may not be compatible with existing wireless systems. As described herein, a CMM is disclosed that is configured to wirelessly transmit data compatible with existing wireless systems and to reduce the cost burden on a user.

Figure 1:
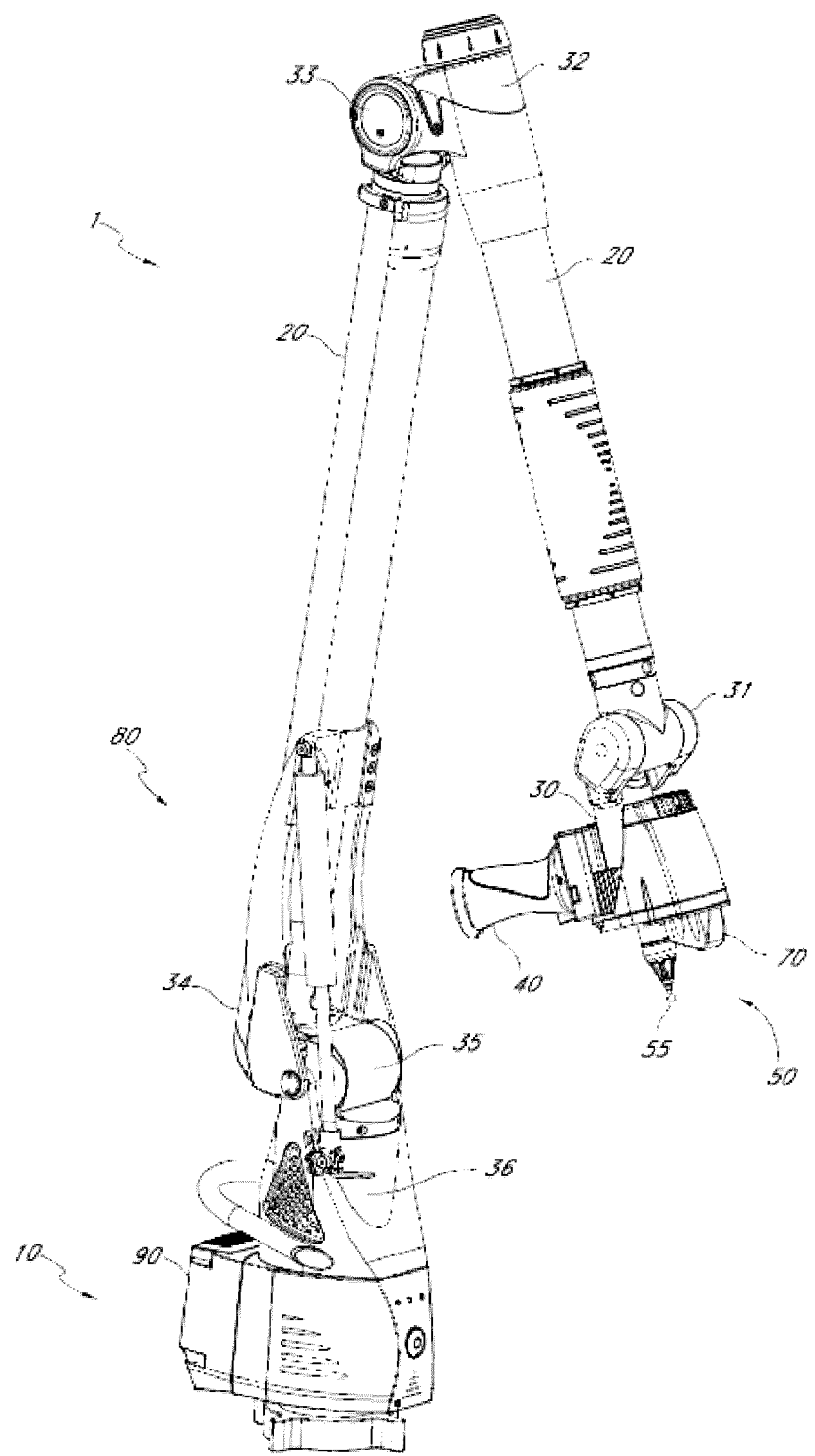
FIG. 1 is a perspective view of an embodiment of an articulated arm.
Figure 1A:
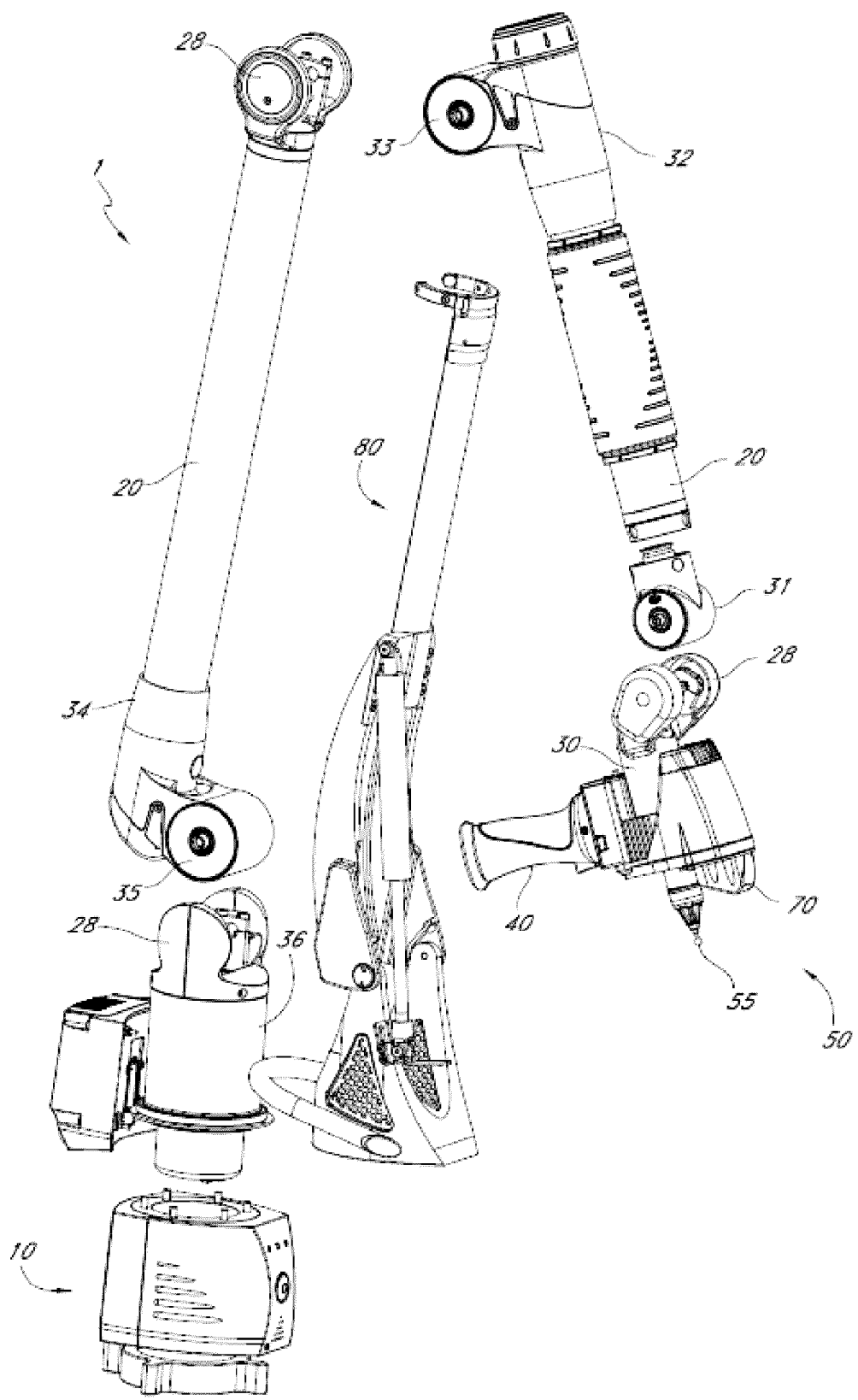
FIG. 1A is an exploded view of an embodiment of the articulated arm of FIG. 1.

FIGS. 1 and 1A illustrate one embodiment of a portable coordinate measuring machine (CMM) arm 1 (e.g., an articulated arm) in accordance with the present invention. In the illustrated embodiment, the CMM arm 1 comprises a base 10, a plurality of rigid transfer members 20, a coordinate acquisition member 50 and a plurality of articulation members 30-36 that form "joint assemblies" connecting the rigid transfer members 20 to one another. The articulation members 30-36 along with the transfer members 20 and hinges (described below) are configured to impart one or more rotational and/or angular degrees of freedom. Through the various members 30-36, 20, the CMM arm 1 can be aligned in various spatial orientations thereby allowing fine positioning and orientating of the coordinate acquisition member 50 in three dimensional space.

The position of the rigid transfer members 20 and the coordinate acquisition member 50 may be adjusted using manual, robotic, semi-robotic and/or any other adjustment method. In one embodiment, the CMM arm 1, through the various articulation members 30-36, is provided with seven rotary axes of movement. It will be appreciated, however, that there is no strict limitation to the number of axes of movement that may be used, and fewer or additional axes of movement may be incorporated into the CMM design.

In an embodiment of the CMM arm 1 as illustrated in FIG. 1, the articulation members 30-36 can be divided into two functional groupings based on their associated motion members operation, namely: 1) those articulation members 30, 32, 34, 36 which are associated with the swiveling motion associated with a specific and distinct transfer member (hereinafter, "swiveling joints"), and 2) those articulation members 31, 33, 35 which allow a change in the relative angle formed between two adjacent members or between the coordinate acquisition member 30 and its adjacent member (hereinafter, "hinge joints" or "hinges"). While the illustrated embodiment includes four swiveling joints and three hinge joints positioned as to create seven axes of movement, it is contemplated that in other embodiments, the number of and location of hinge joints and swiveling joints can be varied to achieve different movement characteristics in a CMM. For example, a substantially similar device with six axes of movement could simply lack the swivel joint 30 between the coordinate acquisition member 50 and the adjacent articulation member 20. In still other embodiments, the swiveling joints and hinge joints can be combined and/or used in different combinations.

As is known in the art (see e.g., U.S. Pat. No. 5,829,148, which is hereby incorporated by reference herein), the transfer members 20 can comprise a pair of dual concentric tubular structures having an inner tubular shaft 20a rotatably mounted coaxially within an outer tubular sheath 20b through a first bearing mounted proximately to a first end of the member adjacent and a second bearing located at an opposite end of the member and which can be positioned within the dual axis housing 100. The transfer members 20 operate to transfer motion from one end of the transfer member to the other end of the transfer member. The transfer members 20 are, in turn, connected together with articulation members 30-36 to form joint assemblies.

The hinge joint, in turn, is formed, in part, by the combination of a yoke 28 extending from one end of a transfer member (see FIG. 1A), the rotational shaft extending through the articulation members 31, 33, 35 and the articulation members 31, 33, 35 themselves, which rotate about the rotational shaft to form a hinge or hinge joint.

Each hinge or swiveling joint has its own dedicated motion transducer in the form of an encoder (not shown). Advantageously, both the hinge and swiveling joint encoders are positioned at least partially, and more preferably, entirely within the dual axis housing 100 within the respective articulation members 30-36.

In various embodiments, the coordinate acquisition member 50 comprises a contact sensitive member 55 (depicted as a hard probe in FIG. 1) configured to engage the surfaces of a selected object and generate coordinate data on the basis of probe contact. In the illustrated embodiment, the coordinate acquisition member 50 also comprises a non-contact scanning and detection component that does not necessarily require direct contact with the selected object to acquire geometry data. As depicted, the non-contact scanning device comprises a non-contact coordinate detection device (shown as a laser coordinate detection device/laser scanner) that may be used to obtain geometry data without direct object contact. The non-contact scanning device can include a camera or other optical device 70, which functions in conjunction with a laser not depicted herein. It will be appreciated that various coordinate acquisition member configurations including: a contact-sensitive probe, a non-contact scanning device, a laser-scanning device, a probe that uses a strain gauge for contact detection, a probe that uses a pressure sensor for contact detection, a device that uses an infrared beam for positioning, and a probe configured to be electrostatically-responsive may be used for the purposes of coordinate acquisition. Further, in some embodiments, a coordinate acquisition member 50 can include one, two, three, or more than three coordinate acquisition mechanisms.

Further description of certain embodiments of a coordinate acquisition member that can be used with the embodiments described herein can be found in U.S. patent application Ser. No. 12/487,535, filed 18 Jun. 2009 and entitled ARTICULATING MEASURING ARM WITH LASER SCANNER, which is incorporated by reference herein in its entirety. As depicted in said reference, the coordinate acquisition member can include a modular laser scanner that can attach to the main body of the coordinate acquisition member (which can also include a touch probe). The modular features can allow various other coordinate detection devices to be used with the coordinate acquisition member. Additionally, other coordinate acquisition members can be used, as is generally known by those of skill in the art.

Figure 2:
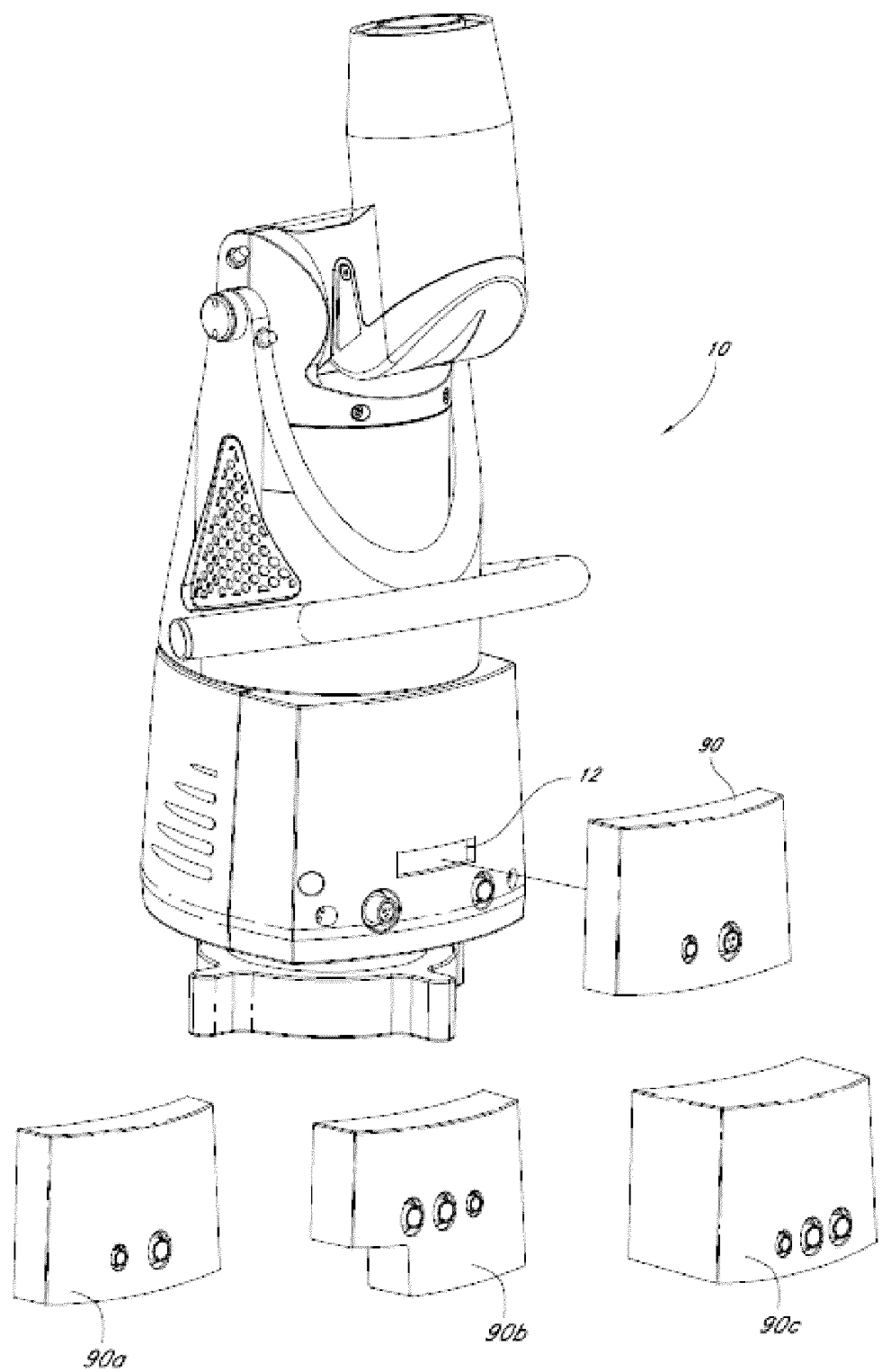
FIG. 2 is a perspective view of an embodiment of a base and a feature pack of the articulated arm of FIG. 1.

FIG. 2 depicts a set of feature packs 90 that can connect with the base 10 via a docking portion 12. The docking portion 12 can form an electronic connection between the CMM arm 1 and the feature pack 90. In some embodiments the docking portion 12 can provide connectivity for high-speed data transfer, power transmission, mechanical support, and the like. Thus, when connected to a docking portion, a feature pack 90 can provide a modular electronic, mechanical, or thermal component to the CMM arm 1, allowing a variety of different features and functionality such as increased battery life, wireless capability, data storage, improved data processing, processing of scanner data signals, temperature control, mechanical support or ballast, or other features. In some embodiments this modular functionality can complement or replace some modular features of the handle 40. The modular feature packs can contain connectors for enhanced functionality, batteries, electronic circuit boards, switches, buttons, lights, wireless or wired communication electronics, speakers, microphones, or any other type of extended functionality that might not be included on a base level product. Further, in some embodiments the feature packs 90 can be positioned at different portions of the CMM arm 1, such as along a transfer member, an articulation member, or as an add-on to the handle 40.

As one example, a feature pack 90 can include a battery, such as a primary battery or an auxiliary battery. Advantageously, in embodiments where the pack 90 is an auxiliary battery the CMM arm 1 can include an internal, primary battery that can sustain operation of the CMM arm 1 while the auxiliary battery is absent or being replaced. Thus, by circulating auxiliary batteries, a CMM arm 1 can be sustained indefinitely with no direct power connection.

As another example, a feature pack 90 can include a data storage device. The available data storage on the feature pack 90 can be arbitrarily large, such that the CMM can measure and retain a large amount of data without requiring a connection to a larger and/or less convenient data storage device such as a desktop computer. Further, in some embodiments the data storage device can transfer data to the arm, including instructions for arm operation such as a path of movement for a motorized arm, new commands for the arm upon pressing of particular buttons or upon particular motions or positions of the arm, or other customizable settings.

In examples where the feature pack 90 includes wireless capability, similar functionality can be provided as with a data storage device. With wireless capability, data can be transferred between the CMM arm 1 and an external device, such as a desktop computer, continuously without a wired connection. In some embodiments, the CMM arm 1 can continuously receive commands from the auxiliary device. Further, in some embodiments the auxiliary device can continuously display data from the arm, such as the arm's position or data points that have been acquired. In some embodiments the device can be a personal computer ("PC") and the feature pack 90 can transmit arm coordinate data and scanner data wirelessly to the PC. Said feature pack can combine the arm data and scanner data in the feature pack before wireless transmission or transmit them as separate data streams.

In further embodiments, the feature packs 90 can also include data processing devices. These can advantageously perform various operations that can improve the operation of the arm, data storage, or other functionalities. For example, in some embodiments commands to the arm based on arm position can be processed through the feature pack 90. In additional embodiments, the feature pack can compress data from the arm prior to storage or transmission.

In another example, the feature pack 90 can also provide mechanical support to the CMM arm 1. For example, the feature pack 90 can connect to the base 10 and have a substantial weight, thus stabilizing the CMM arm 1. In other embodiments, the feature pack 90 may provide for a mechanical connection between the CMM arm 1 and a support on which the CMM arm 1 is mounted.

In yet another example, the feature pack can include thermal functionality. For example, the feature pack 90 can include a heat sink, cooling fans, or the like. A connection between the docking portion and the feature pack 90 can also connect by thermally conductive members to electronics in the base 10 and the remainder of the CMM, allowing substantial heat transfer between the CMM arm 1 and the feature pack 90.

Further, as depicted in FIG. 1, in some embodiments the feature packs 90 can have a size and shape substantially matching a side of the base 10 to which they connect. Thus, the feature pack 90 can be used without substantially increasing the size of the CMM arm 1, reducing its possible portability, or limiting its location relative to other devices.

Again, the feature packs 90 can be used in combination with each other and the other features described herein and/or can be used independently in other types of CMMs.

Figure 3:
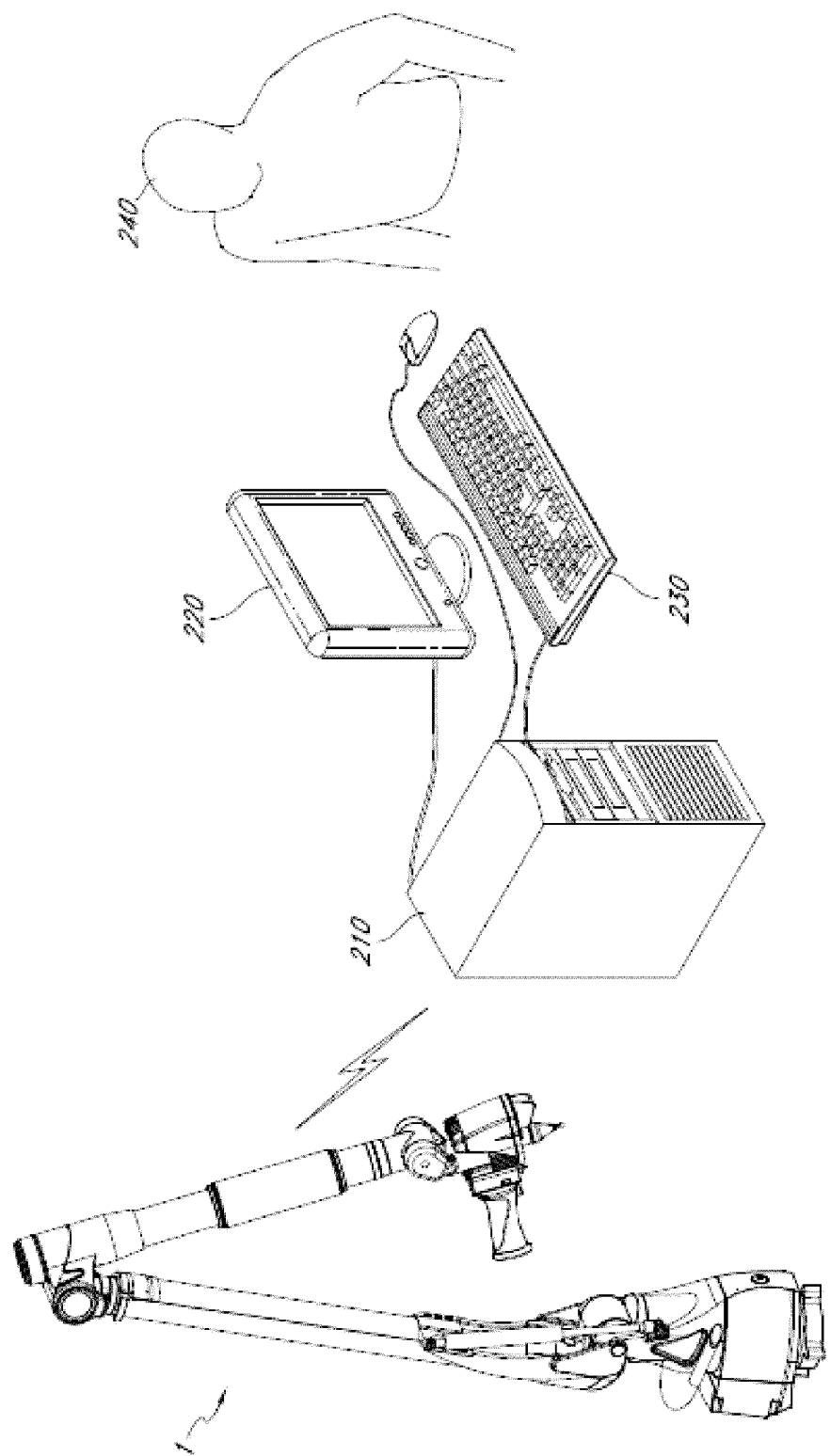
FIG. 3 is a perspective view of an embodiment of an articulated arm in wireless communication with a computer.

As depicted in FIG. 3, the CMM arm 1 can transmit data to a separate, auxiliary device such as a computer 210 coupled to a display 220 and one or more input devices 230. An operator 240 may analyze the data using the computer 210 by manipulating the one or more input devices 230, which may be a keyboard, a mouse, a microphone, a camera, and/or a touch screen. The display 220 may include one or more display regions or portions, each of which displays a different view of the CMM arm 1 in its current position, and optionally a desired calibration position (as described above). Each of these displays may be linked internally within a program and data on computer 210. For example, a program running on a computer 210 may have a single internal representation of the CMM arm's current position in memory and the internal representation may be displayed in two or more abstract or semi-realistic manners on display 220.

In various embodiments, the computer 210 may include one or more processors, one or more memories, and one or more communication mechanisms. In some embodiments, more than one computer may be used to execute the modules, methods, and processes discussed herein. Additionally, the modules and processes described herein may each run on one or multiple processors, on one or more computers; or the modules described herein may run on dedicated hardware. The input devices 230 may include one or more keyboards (one-handed or two-handed), mice, touch screens, voice commands and associated hardware, gesture recognition, or any other means of providing communication between the operator 240 and the computer 210. The display 220 may be a 2D or 3D display and may be based on any technology, such as LCD, LED, CRT, plasma, projection, et cetera.

The communication among the various components may be accomplished via any appropriate coupling, including Universal Serial Bus (USB), VGA cables, coaxial cables, FireWire, serial cables, parallel cables, SCSI cables, IDE cables, SATA cables, wireless based on 802.11 or Bluetooth, or any other wired or wireless connection(s). One or more of the components may also be combined into a single unit or module. In some embodiments, all of the electronic components are included in a single physical unit or module.

Figure 4:
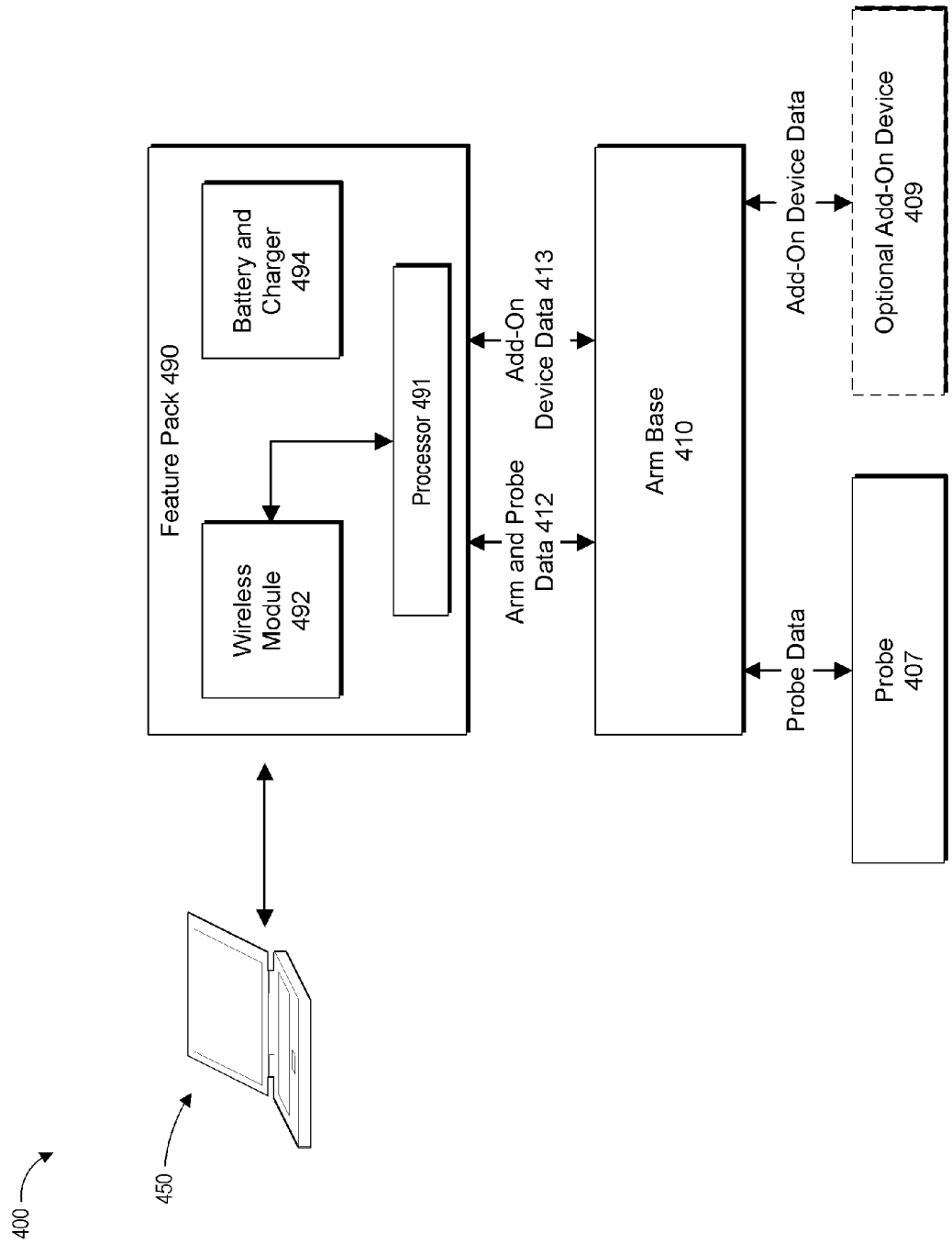
FIG. 4 is an embodiment of a wireless communication system in which an articulated arm of FIG. 1 is in wireless communication with an electronic device.

FIG. 4 depicts a block diagram of an embodiment of a wireless communication system 400 in which a CMM arm, such as the CMM arm 1 described herein with respect to FIGS. 1 and 1A, is in wireless communication with an electronic device, such as a computer 450. The system 400 may include a probe 407, an optional add-on device 409, an arm base 410, a feature pack 490 and/or a computer 450.

In an embodiment, the probe 407 may be a hard probe, a non-contact tube probe, a vibration touch probe, a TP20 probe, or the like. Likewise, the optional add-on device 409 may be any of the probe types described herein. As an example, a third party scanner (e.g., a laser scanner) or other third party device may be coupled to the arm base 410 in place of the optional add-on device 509. The arm base 410 may be similar to the base 10 described herein with respect to FIGS. 1, 1A, and 2. Likewise, the feature pack 490 may be similar to the feature pack 90 described herein with respect to FIG. 2.

In some embodiments, the probe 407 may be configured to capture data and transmit such data to the arm base 410. The arm base 410 may transmit probe data 412 (or a modified version of the probe data) to the feature pack 490. In an embodiment, the probe data 412 may be measured positions of an articulated arm (e.g., in the form of coordinates) and may be transmitted serially. If an optional add-on device 409 is coupled to the arm base 410, then the arm base may receive add-on device data from the optional add-on device 409 and transmit the add-on device data 413 (or a modified version of the add-on device data) to the feature pack 490. In an embodiment, the add-on device data 413 may be transmitted via network-enabled packets (e.g., Ethernet compatible packets).

In an embodiment, the feature pack 490 includes a processor 491, a wireless module 492, and/or a battery and charger 494. The processor 491 may be configured to receive the probe data 412 and/or the add-on device data 413. In certain aspects, the processor 491 executes instructions to prepare the probe data 412 and/or the add-on device data 413 for transmission via the wireless module 492. In further aspects, the processor 491 is configured to process the probe data 412 and/or the add-on device data 413 such that the data can be sent to a display module, not shown, configured to visually display information (e.g., charts, graphs, plots, etc.).

The wireless module 492 may be configured to transmit data over any communication protocol. For example, the wireless module 492 may be configured to transmit the probe data 412 and/or the add-on device data 413 to the computer 450 using any part of the IEEE 802.11 standard. The wireless module 492 can also receive data from the compute 450. For example, the computing device 450 can communicate to the feature pack 490 to provide acknowledgements of transmissions of data received from the feature pack 409, send requests for data, provide firmware updates, and the like.

In some embodiments, the battery and charger 494 may be configured to provide power to the arm base 410, the probe 407, and/or the optional add-on device 409. In further embodiments, the battery and charger 494 may be configured to charge the arm base 410, the probe 407, and/or the optional add-on device 409. As an example, the power for operation or charging may be transmitted via the line that carries the add-on device data 413 as described herein. In other examples, the power for operation or charging may be transmitted via the line that carries the probe data 412.

The battery and charger 494 may allow for a user to exchange a battery while the feature pack 490 is still in operation. For example, the battery in the battery and charger 494 may be hot swappable such that the battery may be removed while the feature pack 490 is operating, and another (or the same) battery may be inserted. A secondary battery or storage element, not shown, may be used to provide a sufficient amount of power to temporarily operate the feature pack 490 while a battery is removed.

Figure 5:
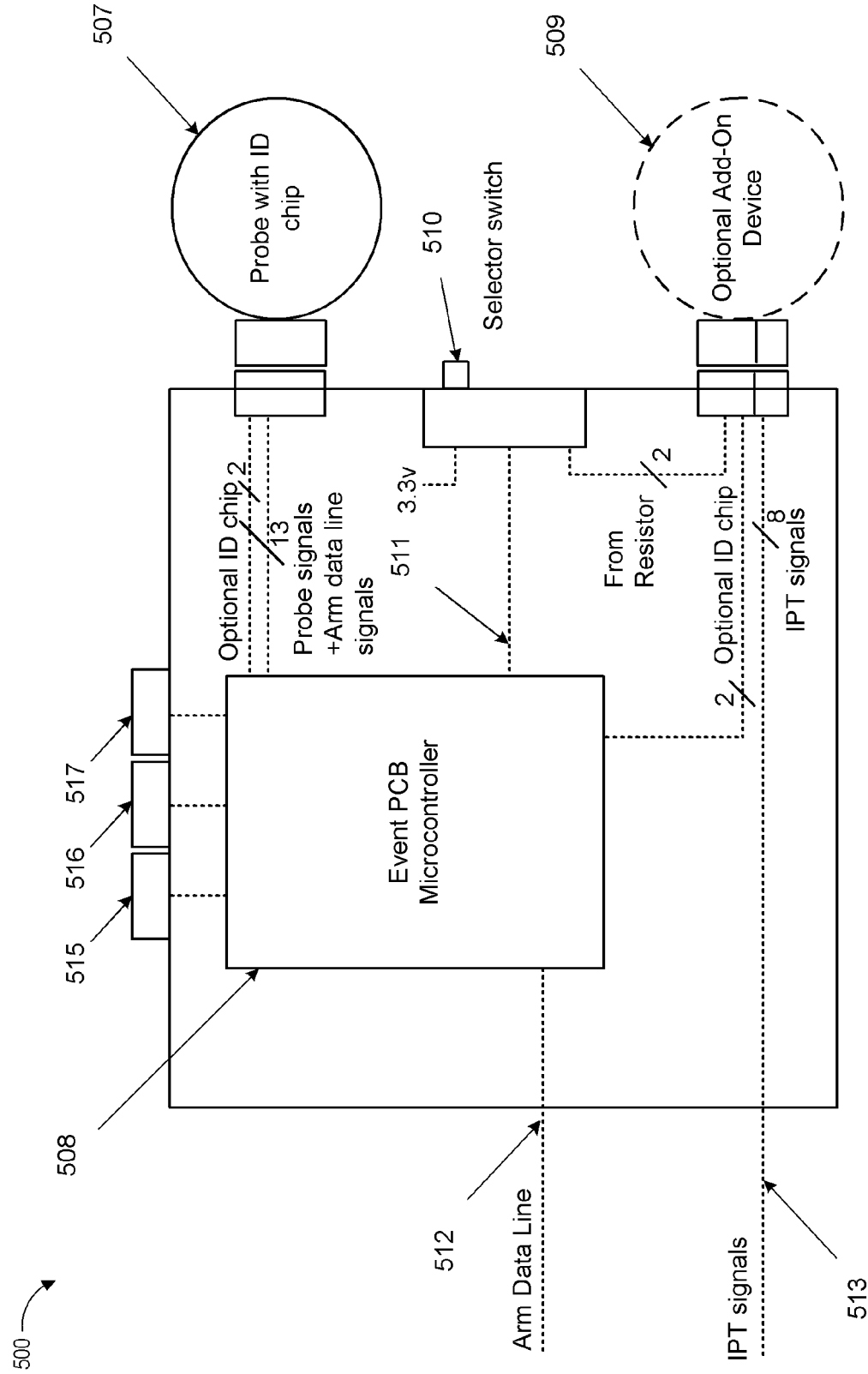
FIG. 5 is an embodiment of a probe circuit of an articulated arm of FIG. 1.

FIG. 5 depicts an embodiment of a probe circuit 500 of a CMM arm, such as the CMM arm 1 described herein with respect to FIGS. 1 and 1A. In an embodiment, the arm base 410 of FIG. 4 includes the probe circuit 500. The probe circuit 500 may include an offset probe 507 in communication with an event microcontroller 508. The offset probe 507 may be similar to the probe 407 described herein with respect to FIG. 4. The offset probe 507 may be a hard probe, a non-contact tube probe, a vibration touch probe, a TP20 probe, or the like. The offset probe 507 may include an ID chip. For example, the event microcontroller 508 may determine the type of probe the offset probe 507 is by access the ID chip.

In some embodiments, when an offset probe 507 is bought into contact with an object, an operator may depress a button, such as button 515, 516, and/or 517, to cause the event microcontroller 508 to record a measurement event. The event microcontroller 508 may transmit the measurement event to a circuit in the base, such as the base 10, via an arm data line 512. In other embodiments, other types of offset probes 507, such as non-contact tube probes, send signals to the event microcontroller 508 to indicate that a measurement should be taken.

In some embodiments, the probe circuit 500 may include an optional add-on device 509. The optional add-on device 509 may be similar to the optional add-on device 409 described herein with respect to FIG. 4. The optional add-on device 509 may be any of the probe types described herein. As an example, a third party scanner (e.g., a laser scanner) or other third party device may be coupled to the probe circuit 500 in place of the optional add-on device 509. A selector switch 510 may allow an operator to select between the offset probe 507 and the optional add-on device 509 or other device.

As with the offset probe 507, the optional add-on device 509 or other device may include an ID chip that may be ready by the event microcontroller 508 via an optional ID chip line. In other embodiments, the optional add-on device 509 or other device may include an ID resistor that is accessed by the event microcontroller 508 via line 511. The event microcontroller 508 may include an analog to digital converter (ADC) for digitizing signals received from the ID resistor. The optional ID chip line and line 511 may not transfer data or power to the offset probe 507 and/or the optional add-on device 509 or other device. As an example, when the CMM arm 1 is used with a laser scanner, the laser may scanner include an ID resistor and not an ID chip.

In some embodiments, an isolated pass through (IPT) line 513 is coupled to the optional add-on device 509 or other device to communicate electrical signals to, and receive power from, outside the CMM arm 1. The IPT line 513 may be configured to carry any type of data formatted for use by any protocol. For example, the IPT line 513 may carry network-enabled packets, such as Ethernet frames, that may be transmitted and received over a network. In this way, the IPT line 513 may be flexible in that it may be configured to carry data for a diverse number and types of devices. In an embodiment, if the CMM arm 1 includes an optional feature pack, such as feature pack 90, the data can be transmitted outside the CMM arm 1 to the feature pack 90.

Figure 6:
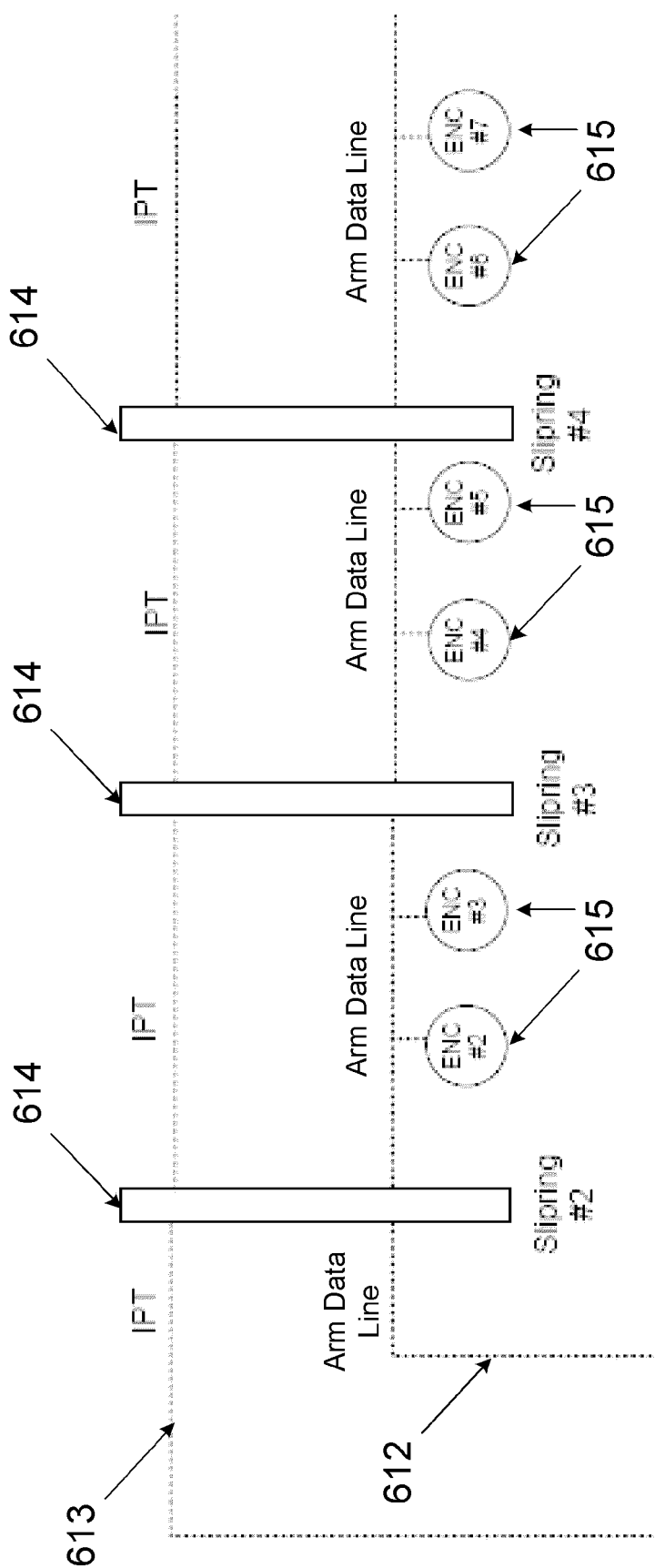
FIG. 6 is an embodiment of a wiring system within an articulated arm of FIG. 1.

FIG. 6 illustrates an embodiment of a wiring system 600 within a CMM arm, such as the CMM arm 1 described herein with respect to FIGS. 1 and 1A. The wiring system 600 may include an arm data line 612 that passes through slip rings 614 and couples to various encoders 615. In some embodiments, position data from the various encoders 615 is communicated on the arm data line 612 to circuitry in the base 10. The IPT lines 613 may also pass through the slip rings 614 to the base 10, but may remain electrically isolated from the circuitry in the base 10.

Figure 7:
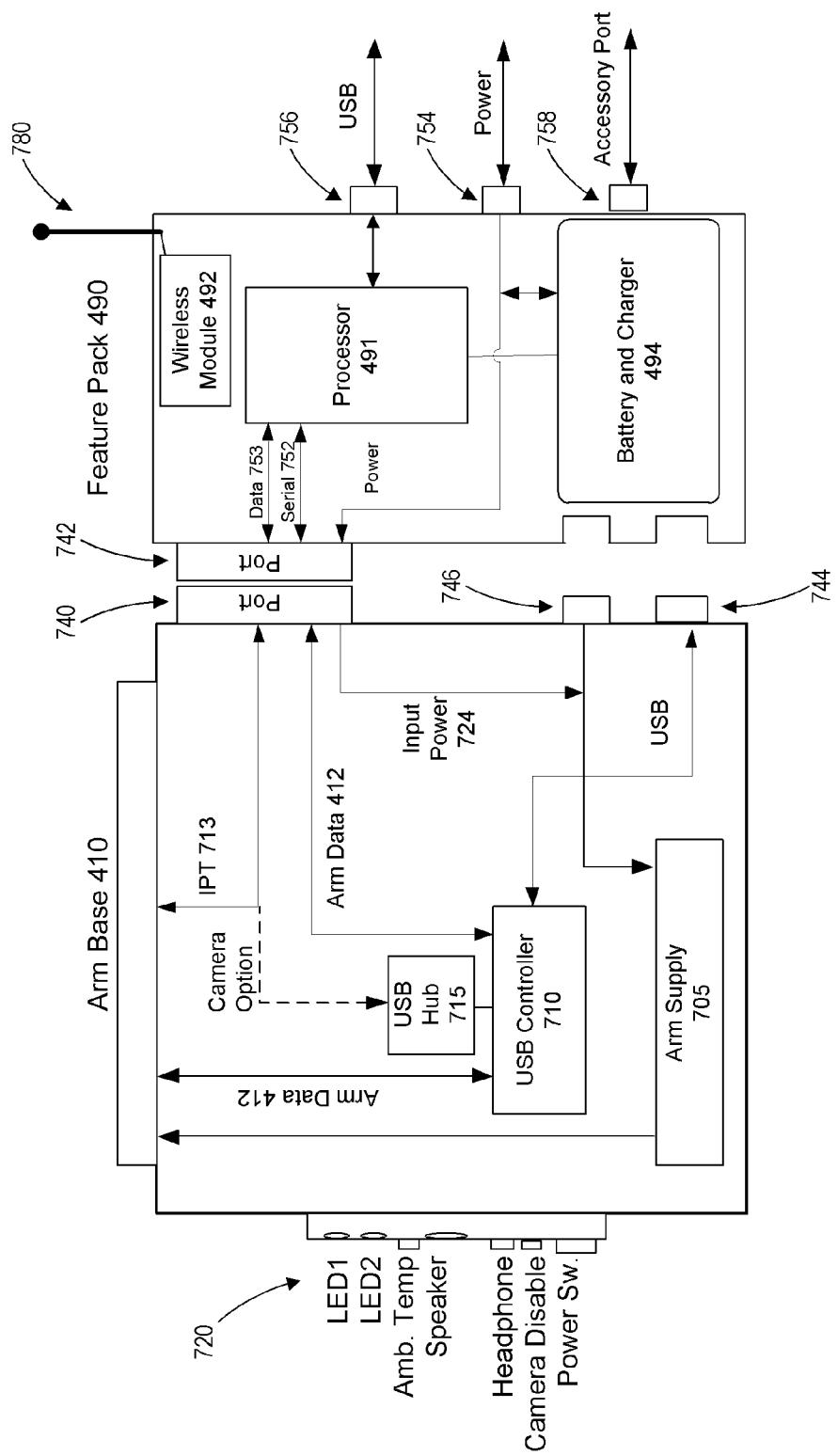
FIG. 7 is an embodiment of an arm base and a feature pack of FIG. 4.

FIG. 7 illustrates an embodiment of an arm base, such as arm base 410 of FIG. 4, coupled to a feature pack, such as feature pack 490 of FIG. 4. In an embodiment, the arm base 410 includes an arm supply 705, a USB controller 710, a USB hub 715, and/or interface devices 720. The arm supply 705 may supply power to other parts of the arm, the probe 407 and/or the optional add-on device 409. The arm supply 705 may receive power from a device connected to port 746 and/or from the feature pack 490 via input power line 724. In some embodiments, the arm supply 705 may receive power from the feature pack 490 via the battery and charger 494. In other embodiments, the arm supply 705 may receive power from the feature pack 490 via a device connected to port 754.

The USB controller 710 may be configured to host a USB device. For example, a USB or other device may couple to port 744. The USB controller 710 may provide power to the coupled device and/or transmit and/or receive data from the coupled device. In an embodiment, if the feature pack 490 is coupled to the arm base 410, the feature pack 490 hides the ports 744 and 746 such that no device may be coupled to either port 744 or 746 while the feature pack 490 is coupled to the arm base 410. A USB device or other device, however, may be connected to the feature pack 490 and arm base 410 via port 756. The USB hub 715 may be configured to provide an interface between a device, such as a camera, and the USB controller 710.

In an embodiment, interface devices 720 may include a first LED indicator, a second LED indicator, an ambient temperature sensor, a speaker, a headphone jack, a camera disable button, a power switch, and/or the like.

As described herein, the arm base 410 may be configured to receive optional add-on device data 413 from an optional add-on device 409. Such data may be carried over IPT 713 within the arm base 410. The IPT line 713 may be similar to the IPT line 513 described herein with respect to FIG. 5.

In some embodiments, the feature pack 490 includes the processor 491, the wireless module 492, and/or the battery and charger 494 as described herein with respect to FIG. 4. In certain aspects, when the feature pack 490 is coupled to the arm base 410 via ports 740 and 742, the processor 491 is configured to transmit and/or receive probe data 412 via serial line 752 and to transmit and/or receive optional add-on device data from the IPT 713 via data line 753.

The processor 491 may be configured to translate data such that it may be received and/or transmitted wirelessly. For example, probe data 412 may be received via serial line 752 and may be serial data. The processor 491 may be configured to convert the serial probe data 412 into network-enabled packets, such as Ethernet frames, that may then be transmitted via the wireless module 492 and antenna 780. The conversion may include associating a timestamp with each data point and inserting the timestamp into the network-enabled packet. In some embodiments, the processor 491 may not need to convert the optional add-on device data received via data line 753 into network-enabled packets because the optional add-on device data may be received in the form of network-enabled packets (e.g., Ethernet frames). In other embodiments, the processor 491 may convert the optional add-on device data in a similar way as it converts the probe data 412.

In further embodiments, the timestamp may be received by the feature pack 490 from the arm base 410. For example, a trigger signal may be sent from the CMM arm 1 to an optional add-on device 409 (e.g., a scanner) upon each measurement of the arm position. Coincident with the arm trigger, the CMM arm 1 can latch or otherwise store the arm position and orientation. The scanner can also record the time of receipt of the signal (e.g. as a timestamp), relative to the stream of scanner images being captured (also, e.g., recorded as a timestamp), and/or a count of each trigger signal received (e.g., for security purposes). In some embodiments, each image captured by the scanner may be numbered. For example, each image captured may be numbered for synchronization purposes (e.g., so that each image is transmitted in order to the computer 450 and/or so that each image is associated with the probe data 412 captured at the same or substantially same time). This time signal data from the CMM arm 1 can be included with the image data from the scanner (e.g., the optional add-on device data 413).

Depending on the relative frequency of the two systems (CMM arm 1 and scanner) there may be more than one arm trigger signal per scanner image. A CMM arm 1 running at a higher (or lower) frequency than the scanner may result in the CMM arm 1 and scanner frequencies being at least partially non-synchronized. For example, in some embodiments, the scanner may await an active low pulse from the CMM arm 1. In other embodiments, the scanner may await an active high pulse from the CMM arm 1. Once the scanner receives the active low pulse (or active high pulse), the scanner may initiate a measuring cycle. While the scanner acquires an image during the cycle, an image may continue to be captured during one or more occurrences of the trigger signal (e.g., the CMM arm 1 may run at 100 MHz and the scanner may run at 40 Hz). Post-processing of the arm and scanner data (412 and 413) can thus combine the arm positions by interpolation with the scanner frames to estimate the arm position at the time of a scanner image. In some embodiments, the interpolation can be a linear interpolation between the two adjacent points. However, in other embodiments higher-order polynomial interpolations or splines can be used to account for accelerations, jerks, etc. This feature of a CMM arm 1 can also be used in combination with the other features described herein and/or can be used independently in other types of CMMs.

In an embodiment, the CMM arm 1 can also record a time of receipt or transmission of the trigger signal (relative to the image being acquired), which may then be associated with probe data 412 by the CMM arm 1 and/or the processor 491.

In some embodiments, the recorded time of the trigger signal (e.g., the timestamp) is a time relative to a time when the first trigger signal was sent. The timestamp may be recorded using a circuit or other such device that performs a counting function. For example, a buffer in the CMM arm 1, scanner, and/or the feature pack 490 may be used to achieve the counting functionality. The first trigger signal may be associated with a time zero, the second trigger signal may be associated with a time one, the third trigger signal may be associated with a time two, and so on. If the feature pack 490 is missing data for a particular time (e.g., no probe data 412 or no add-on device data 413 was received at a particular time), then the feature pack 490 may drop all data (e.g., any probe data 412 or add-on device data 413) received for that particular time in order to resynchronize. As described herein, the computer 450 may also include a circuit or other such device that performs a counting function for the purposes of synchronization.

The processor 491 may also be configured to determine whether the probe data 412 and/or the optional add-on device data 413 is to be transmitted wirelessly via the wireless module 492 or to be transmitted via a wired connection, for example, through port 756. In an embodiment, if a device is coupled to port 756, then the processor 491 may direct probe data 412 and/or optional add-on device data 413 to the coupled device (and any data not directed to the coupled device may be sent to the wireless module). If no device is coupled to port 756, then the processor 491 may direct probe data 412 and/or optional add-on device data 413 to the wireless module 492. In another embodiment, a user may control whether the processor 491 directs probe data 412 and/or optional add-on device data 413 to the wireless module or a device coupled to the port 756 via external controls (e.g., a button, switch, etc.) and/or software.

Figure 8:
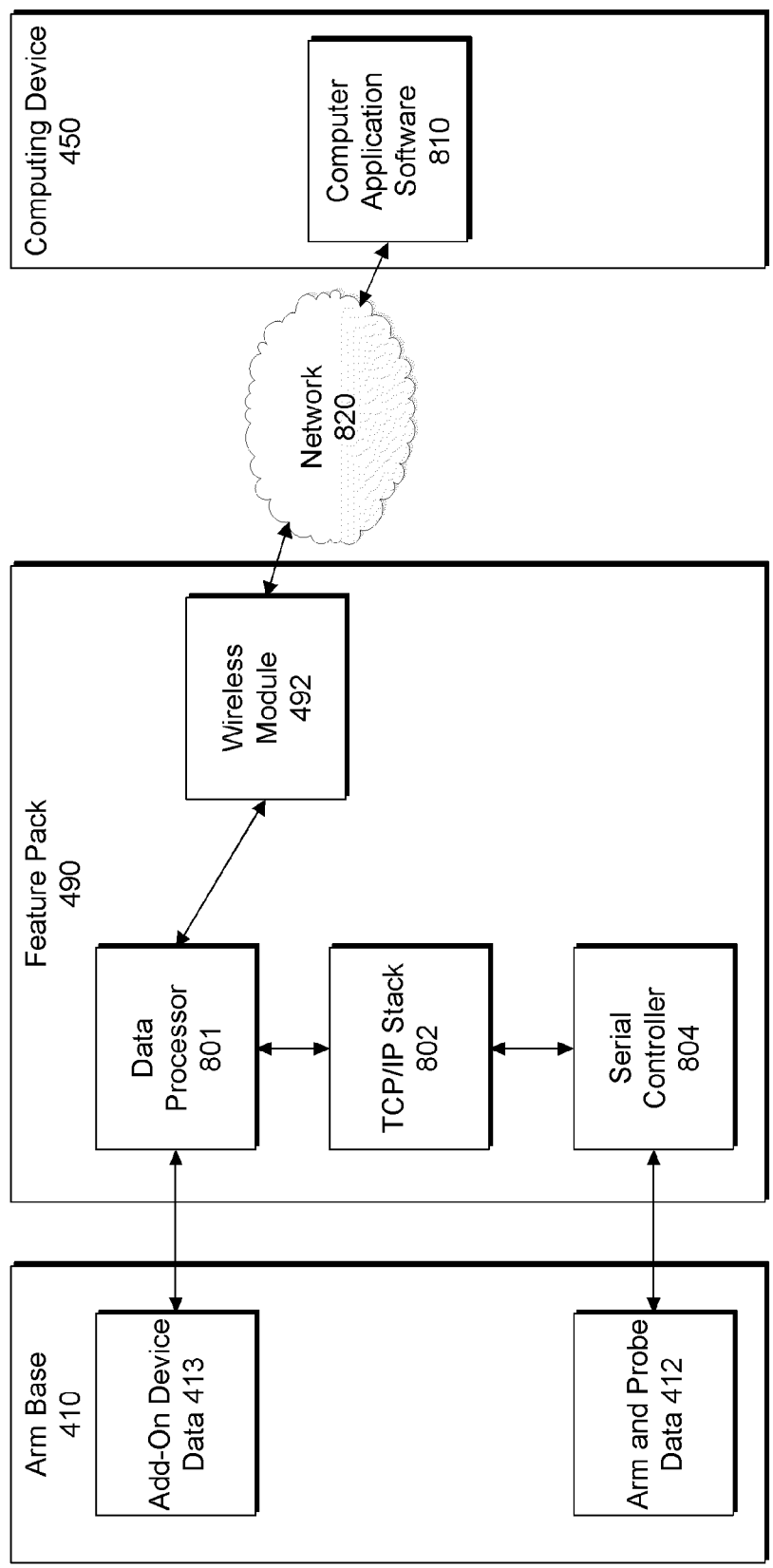
FIG. 8 is an embodiment of an arm base, a feature pack, and a computing device of FIG. 4.

FIG. 8 illustrates an embodiment of an arm base, such as arm base 410 of FIG. 4, coupled to a feature pack, such as feature pack 490 of FIG. 4, and a computing device 850, which may be similar to the computer 450 of FIG. 4. In an embodiment, the arm base 410 includes a module that transmits add-on device data 413 and/or a module that transmits probe data 412. In certain aspects, the same module transmits the add-on device data 413 and the probe data 412. In other aspects, different modules transmit the add-on device data 413 and the probe data 412.

The feature pack may include a data processor 801, a TCP/IP stack module 802, a serial controller 804, and/or the wireless module 492. In some embodiments, the functionality of the data processor 801, the TCP/IP stack module 802, and/or the serial controller 804 is performed by the processor 491 as described herein. In other embodiments, the functionality of the data processor 801, the TCP/IP stack module 802, and/or the serial controller 804 may be combined and performed by one or more modules.

In some embodiments, the data processor 801 is configured to execute instructions. As an example, the data processor 801 may function as a network-enabled controller and processor, such as an Ethernet controller, to communicate using a specific physical layer and/or data link layer. The data processor 801 may be configured to receive add-on device data 413, which in some embodiments may comprise Ethernet frames.

In an embodiment, the data processor 801 operates in a bridge mode. The optional add-on device 409 and the data processor 801 may each have their own IP address and form one network (e.g., a local area network (LAN)). Likewise, the computer 450 may form a second network with an access point. By operating in a bridge mode, the data processor 801 may allow a pass-through such that the computer 450 may communicate directly with the feature pack 490 or the optional add-on device 409. For example, in the bridge mode, some or all packets from the computer 450 may include a data link layer address (e.g., a media access control (MAC) address) of the wireless module 492 in the destination field and an IP address of the optional add-on device 409. Once the feature pack 490 receives such a packet, the data processor 801 can change an address in the destination field to the MAC address of the optional add-on device 409. In an embodiment, the data processor 801 determines which MAC address to insert into the destination field based on the IP address included in the packet (e.g., the feature pack 490 may include memory, not shown, in which IP addresses are associated with MAC addresses). Once the MAC address is changed, the data processor 801 may forward the packet to the optional add-on device 409. Thus, in certain embodiments, the data processor 801 performs MAC-spoofing (or a variation of MAC-spoofing) in order to allow the computer 450 to communicate with the optional add-on device 409 without requiring the computer 450 to know the MAC address of the add-on device 409. During the bridge mode, the feature pack 490 may operate as a point-to-point or an ad-hoc network. In an embodiment, the data processor 801 forwards data to the wireless module 492 for transmission over a network.

In some embodiments, the serial controller 804 is configured to receive probe data 412, which in some embodiments includes serial data. For example, the serial controller 804 may be a USB controller. The serial controller 804 may server as an interface between the module that transmits the probe data 412 and the TCP/IP stack module 802.

The TCP/IP stack module 802 may be configured to convert data received from the serial controller 804 into network-enabled packets that may be transmitted over a network. For example, the TCP/IP stack module 802 may receive serial data (e.g., probe data 412) from the serial controller 804 and convert the serial data into Ethernet frames. The conversion may include converting the serial data into a form that is compatible with the transmission control protocol (TCP) and/or the Internet protocol (IP) (e.g., a network-enabled data packet). As described herein, the conversion may include applying a timestamp to the serial data by inserting the timestamp into the network-enabled data packet that comprises the serial data. The timestamp information may be received from the CMM arm 1. In an embodiment, the TCP/IP stack module 802 transmits the network-enabled data packet to the data processor 801 and/or the wireless module 492 for transmission over a network.

The wireless module 492 may be configured to receive data for transmission over a network, such as a wireless communication network. In an embodiment, the wireless module 492 may combine the network-enabled data packet (e.g., network-enabled packets comprising probe data 412) with the add-on device data 413 (e.g., network-enabled packets) into a single stream of packetized data that may be transmitted over a network, such as network 820. In other embodiments, the wireless module 492 may transmit the network-enabled data packet and the add-on device data 413 in separate streams of packetized data over the network 820. As described herein, the timestamp associated with the serial data and the timestamp associated with the add-on device data 413 may be used for synchronization purposes (e.g., to properly combine the serial data and the add-on device data 413 into a single data stream).

In some embodiments, the feature pack 490 also includes a wired module, not shown, that prepares data for transmission over a wired network (e.g., when a device is connected to port 756 of FIG. 7).

The computing device 850 may be configured to receive the single stream of packetized data for further processing. For example, the computing device 850 may be configured to visually display the data included in the packetized data (e.g., charts, graphs, plots, etc.). In an embodiment, the computing device 850 may include a computer application software module 810. The computer application software module 810 may be configured to receive the single stream of packetized data via the network 820, parse the data to extract the add-on device data 413 and/or the probe data 412, and/or prepare the data for display by a display module (not shown).

In some embodiments, the computer application software module 810 may parse the data based on an expected order of receiving the probe data 412 and/or the add-on device data 413.

In certain aspects, as described herein, the computer application software module 810 includes hardware and/or software that performs a counting function. For example, a buffer in the computer application software module 810 may be used to achieve the counting functionality. As data is received by the computer application software 810 from the feature pack 490, the counter may increase and the count value may be associated with the probe data 412 and/or the add-on device data 413 just parsed. In this way, the probe data 412 and the add-on device data 413 can be associated with each other as measurements taken at a same or nearly same time if such data is later displayed by a display module.

Figure 9:
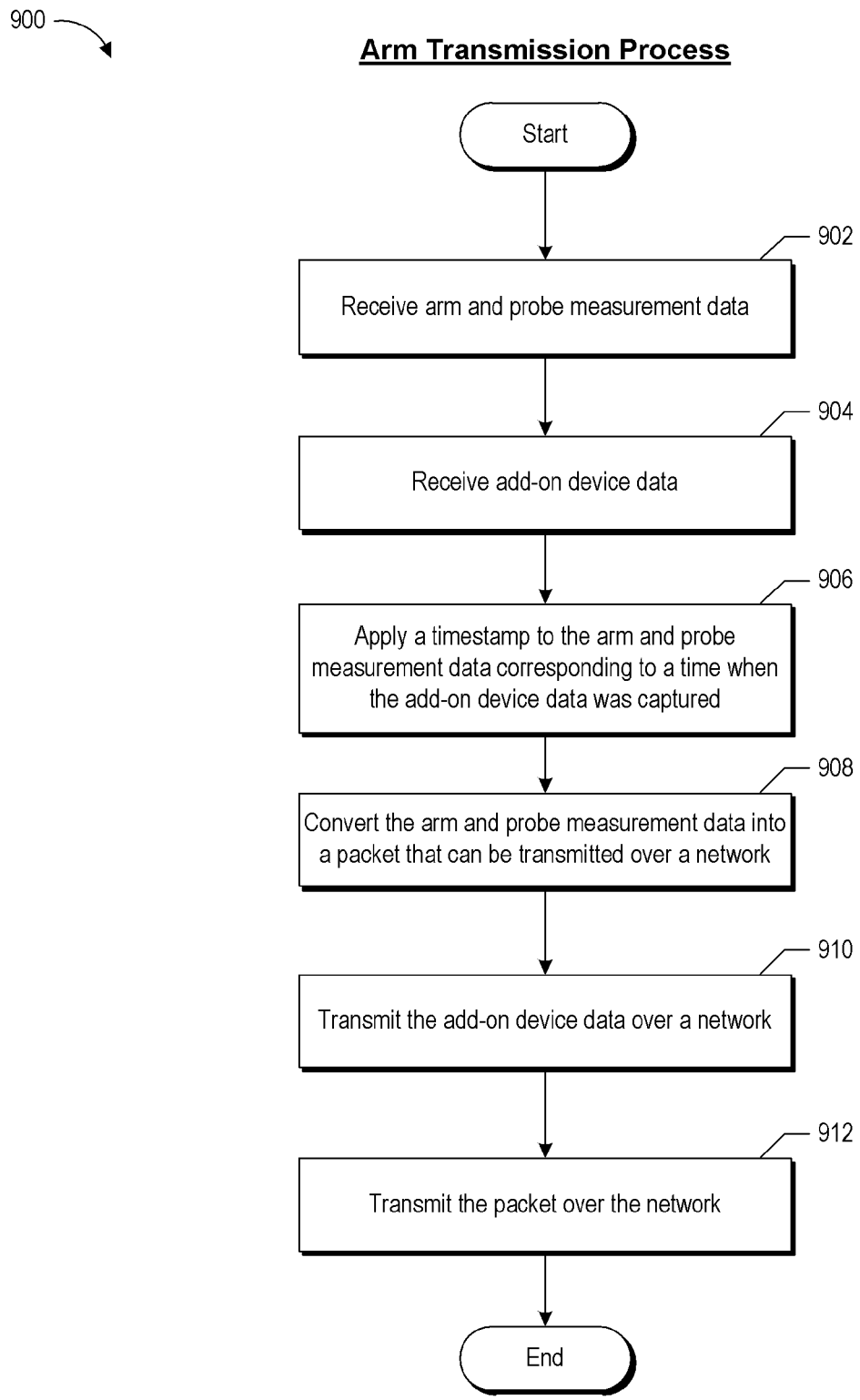
FIG. 9 is a flow diagram of an embodiment of a process of transmitting data by an articulated arm.

FIG. 9 illustrates an embodiment of a process 900 for transmitting data by an articulated arm. The process may be performed, for example, by the feature pack 490 of FIG. 4. The process may be performed to wirelessly transmit probe data and/or add-on device data in a single data stream for further processing by a device that receives the data.

At block 902, arm and probe data is received. In an embodiment, arm and probe data comprises measured positions of an articulated arm. At block 904, add-on device data is received. In an embodiment, add-on device data comprises measurements taken by an optional add-on device, such as a scanner. At block 906, a timestamp is applied to the arm and probe measurement data corresponding to a time when the add-on device data was captured. In an embodiment, the add-on device data is captured when a trigger signal is sent to the optional add-on device by the CMM arm.

At block 908, the arm and probe measurement data is converted into a packet that can be transmitted over a network. At block 910, the add-on device data is transmitted over a network. At block 912, the packet is transmitted over a network. In an embodiment, the add-on device data and the packet are transmitted over the network together in a single data stream.

Figure 10:
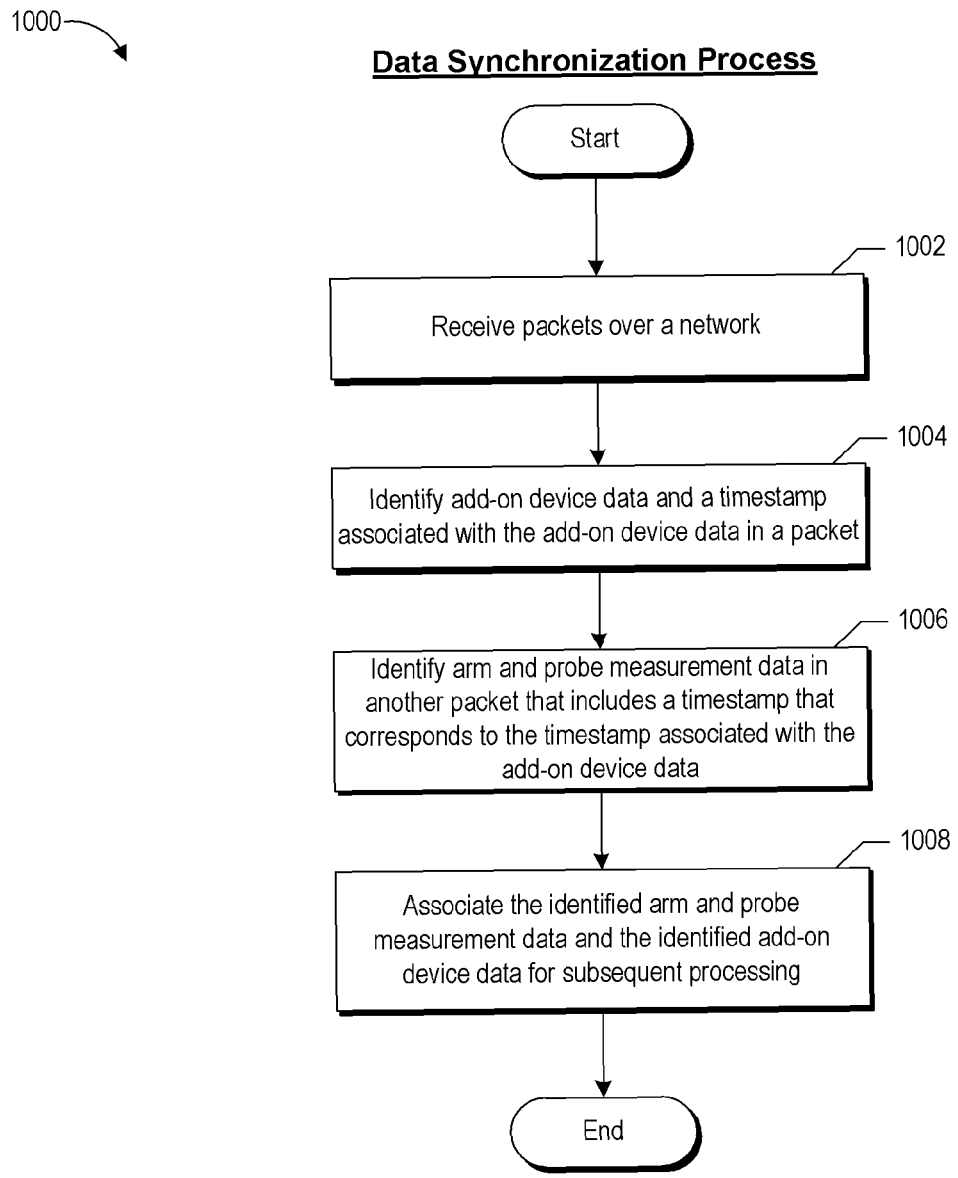
FIG. 10 is a flow diagram of an embodiment of a process of synchronizing data received by a base station.

FIG. 10 illustrates an embodiment of a process 1000 for synchronizing data received by a base station. The process may be performed, for example, by the computer 450 of FIG. 4. The process may be performed to analyze probe data and/or add-on device data transmitted wirelessly in a single data stream.

At block 1002, packets are received over a network. In embodiment, the packets include arm and probe data and add-on device data. At block 1004, add-on device data and a timestamp associated with the add-on device data is identified in a packet. At block 1006, an arm and probe measurement data is identified in another packet that includes a timestamp that corresponds to the timestamp associated with the add-on device data. At block 1008, the identified arm and probe measurement data is associated with the identified add-on device data for subsequent processing.

Figure 11:
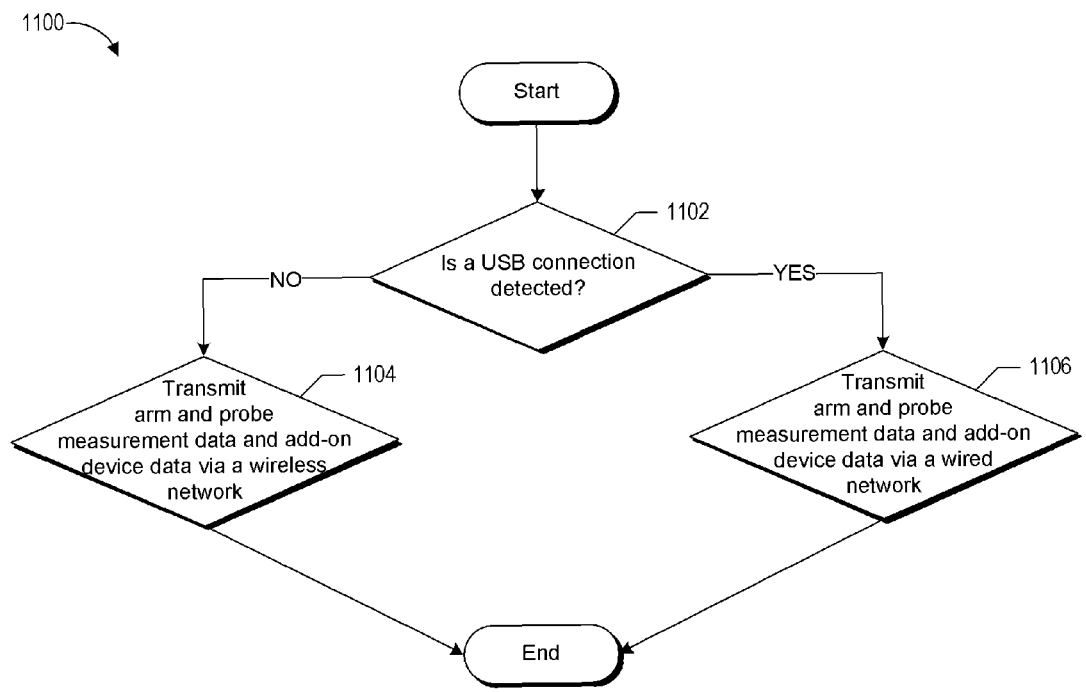
FIG. 11 is a decision diagram of an embodiment of a process of selecting a type of data transmission by an articulated arm.

FIG. 11 illustrates an embodiment of a process 1100 for selecting a type of data transmission. The process may be performed, for example, by the feature pack 490 of FIG. 4. The process may be performed to switch between transmitting data over a USB connection and transmitting data wirelessly.

At block 1102, it is determined whether a USB connection is detected. In an embodiment, a USB connection is detected if a device is connected to a USB port. In some embodiments, if a USB connection is not detected, after block 1102, the process 1100 proceeds to block 1104. At block 1104, arm and probe measurement data and add-on device data is transmitted via a wireless network. In other embodiments, if a USB connection is detected, after block 1102, the process 1100 proceeds to block 1106. At block 1106, arm and probe measurement data and add-on device data is transmitted via a wired network.

TERMINOLOGY

The various devices, methods, procedures, and techniques described above provide a number of ways to carry out the invention. Of course, it is to be understood that not necessarily all objectives or advantages described may be achieved in accordance with any particular embodiment described herein. Also, although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of preferred embodiments herein.

Many other variations than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A coordinate measurement device, comprising:
an articulated arm comprising a plurality of articulated arm members, a coordinate acquisition member at a distal end, and a base at a proximal end, wherein the coordinate acquisition member generates coordinate data based on a measured position of the articulated arm;
an add-on device assembly coupled to the coordinate acquisition member, wherein the add-on device assembly generates an add-on device data packet that can be transmitted over a network in response to a trigger signal received by the add-on device assembly that indicates a time at which the coordinate acquisition member measured a position of the articulated arm, and wherein the add-on device data packet comprises measurement data of the add-on device assembly; and
a feature pack coupled to the base of the articulated arm, wherein the feature pack receives the coordinate data and the add-on device data packet, inserts bits of the coordinate data into a packet that can be transmitted over a network, and wirelessly transmits the packetized coordinate data and the add-on device data packet to a base station.

2. The device of claim 1, wherein the time at which the coordinate acquisition member measured a position of the articulated arm is a time relative to a time when a first trigger signal was received by the add-on device assembly.

3. The device of claim 1, wherein the base station is configured to communicate with the add-on device assembly through the feature pack, and wherein a base station packet transmitted by the base station and intended for the add-on device assembly comprises a media access control (MAC) address of the feature pack.

4. The device of claim 3, wherein the feature pack is configured to receive packets addressed to the MAC address of the feature pack from a computer system.

5. The device of claim 4, wherein, in response to receiving the packets from the computer system, the feature pack is further configured to modify the MAC address identified in the packets to a second MAC address of the add-on device assembly, thereby enabling the computing device to communicate directly with the add-on device assembly without requiring the computing device to know the second MAC address of the add-on device assembly.

6. The device of claim 1, wherein the articulated arm is configured to generate coordinate data at a higher frequency than the add-on device assembly is configured to generate add-on device data.

7. A method of operating a coordinate measurement device, comprising:
receiving coordinate data based on measured positions of an articulated arm;
receiving add-on device data packets that can be transmitted over a network from an add-on device assembly coupled to the articulated arm, wherein the add-on device data packets are received in response to trigger signals provided to the add-on device assembly that indicate times at which positions of the articulated arm are measured, and wherein the add-on device data packets comprise measurement data of the add-on device assembly;
inserting portions of the received coordinate data into packets to produce packetized coordinate data that can be transmitted over a network; and
transmitting wirelessly the packetized coordinate data and the add-on device data packets to a base station.

8. The method of claim 7, further comprising receiving wirelessly a base station packet from the base station that is intended for the add-on device assembly.

9. The method of claim 8, further comprising modifying a media access control (MAC) address included in the base station packet to a MAC address of the add-on device assembly.

10. A base station, comprising:

one or more processors configured to:

receive wirelessly over a network packetized coordinate data and an add-on device data packet, wherein the packetized coordinate data comprises coordinate data derived from a measured position of an articulated arm, and wherein the add-on device data packet comprises measurement data of the add-on device assembly, and extract coordinate data from the packetized coordinate data and to extract add-on device measurement data from the add-on device data packet, and synchronize the extracted coordinate data with the extracted add-on device measurement data for further processing, wherein said synchronization is based on a timestamp of the packetized coordinate data and a timestamp of the add-on device data packet.

11. The base station of claim 10, further comprising a transmitter configured to transmit a base station packet intended for the add-on device assembly responsive to receiving the packetized coordinate data or the add-on device data packet.

12. A method of operating a base station, comprising:

receiving wirelessly over a network packetized coordinate data and an add-on device data packet, wherein the packetized coordinate data comprises coordinate data based on a measured position of an articulated arm, and wherein the add-on device data packet comprises measurement data of the add-on device assembly;

extracting coordinate data from the packetized coordinate data and extracting add-on device measurement data from the add-on device data packet; and associating the extracted coordinate data with the extracted add-on device measurement data for further processing, wherein the association is based on a timestamp of the packetized coordinate data and a timestamp of the add-on device data packet.

13. The method of claim 12, further comprising transmitting a base station packet to the add-on device assembly through a feature pack, wherein the base station packet comprises a media access control (MAC) address of the feature pack and an Internet Protocol (IP) address of the add-on device assembly.

* * * * *